United States Patent
Oo et al.

(10) Patent No.: US 7,585,358 B2
(45) Date of Patent: Sep. 8, 2009

(54) SMALL AND LARGE PARTICLE RECIRCULATION FILTER

(75) Inventors: Aung Lwin Oo, Singapore (SG); Ishak Sugeng Iskandar, Singapore (SG); Asmin Buang, Singapore (SG); Chakravarty Barish, Singapore (SG); Kiam Siang Tan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 464 days.

(21) Appl. No.: 11/466,970

(22) Filed: Aug. 24, 2006

(65) Prior Publication Data

US 2008/0047437 A1    Feb. 28, 2008

(51) Int. Cl.
  *G11B 33/14* (2006.01)
  *B01D 53/04* (2006.01)

(52) U.S. Cl. ................. 96/132; 96/134; 55/485

(58) Field of Classification Search ............... 96/134, 96/135, 131, 132, 153, 154; 55/385.6, 485–487; 360/97.02, 97.03
  See application file for complete search history.

(56) References Cited

U.S. PATENT DOCUMENTS

| | | | |
|---|---|---|---|
| 2,586,935 A * | 2/1952 | Gerson | 96/383 |
| 5,538,545 A * | 7/1996 | Dauber et al. | 96/153 |
| 5,593,482 A * | 1/1997 | Dauber et al. | 96/117.5 |
| 5,869,009 A | 2/1999 | Bellefeuille et al. | |
| 5,980,616 A * | 11/1999 | Johnson et al. | 96/135 |
| 5,997,618 A | 12/1999 | Schneider et al. | |
| 6,077,335 A | 6/2000 | Schneider et al. | |
| 6,168,681 B1 | 1/2001 | Bellefeuille et al. | |
| 6,208,484 B1 | 3/2001 | Voights | |
| 6,214,095 B1 * | 4/2001 | Logan et al. | 96/147 |
| 6,238,467 B1 | 5/2001 | Azarian et al. | |
| 6,261,979 B1 | 7/2001 | Tanaka et al. | |
| 6,296,691 B1 | 10/2001 | Gidumal | |
| 6,395,073 B1 | 5/2002 | Dauber | |
| 6,475,269 B1 | 11/2002 | Turner | |
| 6,654,201 B2 | 11/2003 | Smith | |
| 6,665,150 B2 | 12/2003 | Smith | |
| 6,709,498 B2 | 3/2004 | Tuma | |
| 6,824,595 B2 * | 11/2004 | Ueki et al. | 96/134 |
| 6,936,093 B2 | 8/2005 | Isogawa et al. | |
| 6,959,586 B2 | 11/2005 | Watts et al. | |
| 7,153,565 B1 * | 12/2006 | Nabata et al. | 428/316.6 |
| 7,280,311 B1 * | 10/2007 | Ou-Yang et al. | 360/97.02 |
| 7,318,859 B2 * | 1/2008 | Ball et al. | 96/121 |

FOREIGN PATENT DOCUMENTS

WO    00/49616    8/2000

* cited by examiner

*Primary Examiner*—Frank M Lawrence
(74) *Attorney, Agent, or Firm*—Leanne Taveggia Farrell; Westman, Champlin & Kelly, P.A.

(57) ABSTRACT

A recirculation filter includes a first layer and a second layer. The first layer has a first side and a second side and is configured to trap particles that are of a first size. The second layer has a first portion adjacent to the first side of the first layer and a second portion adjacent the second side of the first layer. The second layer is configured to trap particles that are of a second size. The second size of particles trapped by the second layer is greater than the first size of particles trapped by the first layer.

16 Claims, 5 Drawing Sheets

| | doping weight (g.) | weight of filter before doping (g.) | weight of filter after doping (g.) | weight gain in filter (g.) | particle absorption rate (gain/doped) |
|---|---|---|---|---|---|
| filter 236 specimen #1 | 0.03034 | 0.06021 | 0.06045 | 0.00024 | 0.791 |
| filter 236 specimen #2 | 0.03089 | 0.05832 | 0.05859 | 0.00027 | 0.874 |
| filter 236 specimen #3 | 0.03078 | 0.05152 | 0.05178 | 0.00026 | 0.845 |
| filter 236 specimen #4 | 0.03040 | 0.06002 | 0.06025 | 0.00023 | 0.757 |
| filter 336 specimen #1 | 0.03081 | 0.05763 | 0.05832 | 0.00069 | 2.240 |
| filter 336 specimen #2 | 0.03072 | 0.05693 | 0.05733 | 0.00040 | 1.302 |
| filter 336 specimen #3 | 0.03009 | 0.05775 | 0.05833 | 0.00058 | 1.928 |
| filter 336 specimen #4 | 0.03050 | 0.05856 | 0.05894 | 0.00038 | 1.246 |

SMALL AND LARGE PARTICLE RECIRCULATION FILTER

FIELD OF THE INVENTION

The present invention relates generally to a recirculation filter, and more particularly, but not by limitation, to filtering particulate with a recirculation filter.

BACKGROUND OF THE INVENTION

A typical data storage system or disc drive includes a rigid housing that encloses a variety of components. The components can include a storage medium, usually in the form of one or more discs, having data surfaces for storage of digital information. The discs are mounted on a spindle motor that causes the discs to spin and the data surfaces of the discs to pass under aerodynamic bearing disc head sliders. The sliders carry transducers, which write information to and read information from the data surfaces of the discs.

To increase recording area density, fly height is lowered and the disc is manufactured as smooth as possible. During disc drive operation, serious damage to the data surface of the disc and the sliders can result during lowered fly height if a particle were to become present between the disc and the slider. In general, the majority of the storage medium defect failures are due to particle-induced scratch on the surface of the disc.

Small and large particles released from drive components and the disc drive environment are unavoidable in the disc drive. A recirculation filter is one of the filters that are currently used in disc drive filtration system to protect the disc from these particles. Existing recirculation filters are designed to trap small particles having a size at least as great as approximately 2 μm. However, particle-induced scratch can also be generated by large particles impinging on the disc at high velocities.

Embodiments of the present invention provide solutions to these and other problems, and offer other advantages over the prior art.

SUMMARY OF THE INVENTION

A recirculation filter is provided. The recirculation filter includes a first layer having a first side and a second side. The first layer is configured to trap particles that are of a first size. The recirculation filter also includes a second layer having a first portion adjacent to the first side of the first layer and a second portion adjacent the second side of the first layer. The second layer is configured to trap particles that are of a second size. The second size of particles trapped by the second layer is greater than the first size of particles trapped by the first layer.

The first layer can be an absorbent thick layer. The second layer can be a first absorbent thin layer positioned about the absorbent thick layer. The recirculation filter can also include an outer mesh layer positioned about the first absorbent thin layer and the absorbent thick layer.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
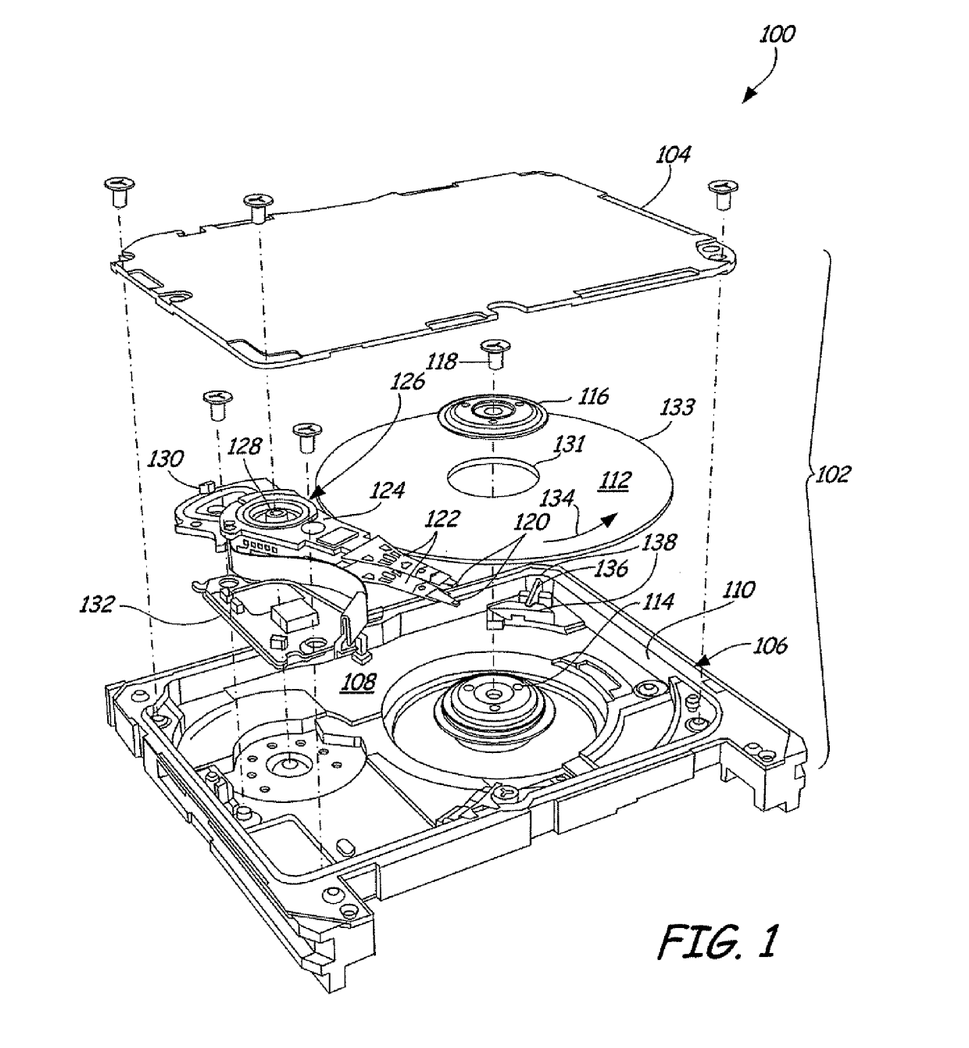
FIG. 1 illustrates perspective view of a disc drive.

FIG. 1 is an exploded perspective view of a disc drive 100 in which embodiments of the present invention are useful. Disc drives are common data storage systems. One or more embodiments of the present invention are also useful in other types of data storage and non-data storage systems.

Disc drive 100 includes a housing 102 having a cover 104 and a base 106. As shown, cover 104 attaches to base 106 to form an enclosure 108 enclosed by a perimeter wall 110 of base 106. The components of disc drive 100 are assembled to base 106 and are enclosed in enclosure 108 of housing 102. As shown, disc drive 100 includes a disc or medium 112. Although FIG. 1 illustrates medium 112 as a single disc, those skilled in the art should understand that more than one disc can be used in disc drive 100. Medium 112 stores information in a plurality of circular, concentric data tracks and is mounted on a spindle motor assembly 114 by a disc clamp 116 and pin 118. Spindle motor assembly 114 rotates medium 112 causing its data surfaces to pass under respective hydrodynamic bearing slider surfaces. Each surface of medium 112 has an associated slider 120, which carries transducers that communicate with the surface of the medium. The slider and transducers are often together referred to as a read/write head.

During operation, as disc 112 rotates, air is dragged under the hydrodynamic bearing of slider 120 in a direction approximately parallel to the tangential velocity of disc 112. As the air passes beneath the bearing surfaces, air compression along the air flow path causes the air pressure between the disc surface and the bearing surfaces to increase, which creates a hydrodynamic lifting force that counteracts a load force provided by suspension 112. This hydrodynamic lifting force causes the slider 120 to "fly" above, and in close proximity, to the disc surface of disc 112. To provide an increased recording area density, a height at which the slider 120 "flies" is in very close proximity to disc 112 and disc 112 is manufactured as smooth as possible.

In the example shown in FIG. 1, sliders 120 are supported by suspension assemblies 122, which are, in turn, attached to track accessing arms 124 of an actuator mechanism 126. Actuator mechanism 126 is rotated about a shaft 128 by a voice coil motor 130, which is controlled by servo control circuitry within internal circuit 132. Voice coil motor 130 rotates actuator mechanism 126 to position sliders 120 relative to desired data tracks, between a disc inner diameter 131 and a disc outer diameter 133.

Disc 112 rotates in a counterclockwise rotational direction 134, which induces significant airflow within housing 102 in the same rotational direction 134. This airflow can contain both small (i.e., particles having a size less than approximately 2 μm) and large sized particles (i.e., particles having a size between approximately 2 and 20 μm) that are released from components within disc drive 100 and are found in the disc drive environment. Serious damage to the surface of disc 112 can result if a particle were to become present between the disc and slider 120. For example, media defect failures are generally particle-induced failures, such as scratches.

To prevent particle-induced media defect failures, a recirculation filter 136 is included in housing 102 and supported by recirculation filter support 138. The recirculation filter 136 removes particles from the air before the air is recirculated back to disc 112. Currently, recirculation filters in disc drives are generally designed to trap only particles having a size of less than 2 µm. However, particle-induced failures on the media can also be generated due to ballistic damage from large particles (i.e., particles having a size as great as approximately 20 µm) impinging on the disc at a high velocity.

Figure 2:
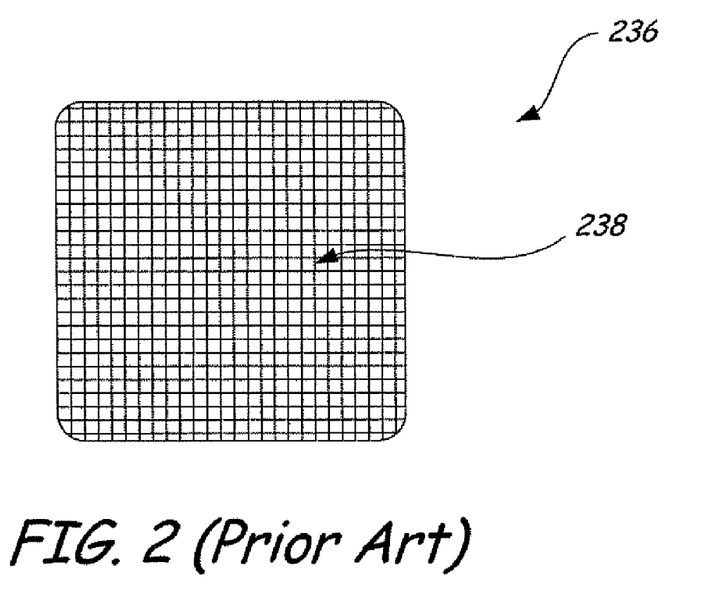
FIG. 2 illustrates a front view of a prior art recirculation filter.
Figure 3:
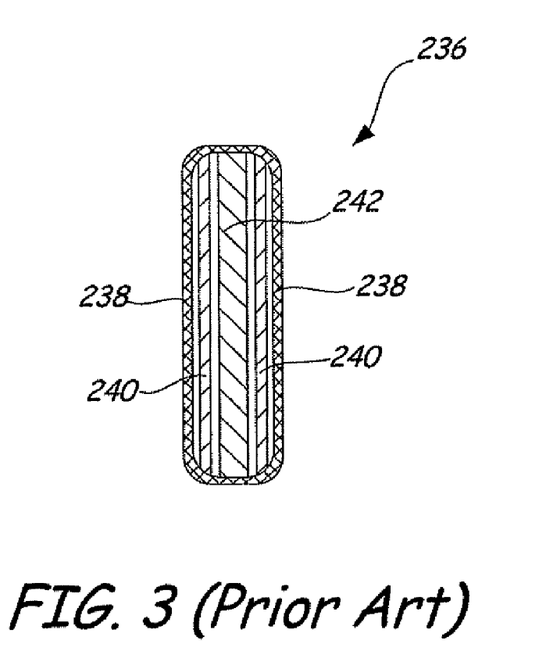
FIG. 3 is a sectional view of the prior art recirculation filter illustrated in FIG. 2.

FIGS. 2 and 3 illustrate a front view and a sectional view, respectively, of a prior art recirculation filter 236. Recirculation filter 236 includes an outer mesh layer 238. Particles having a size of at least as great as approximately 2 µm are able to penetrate outer mesh layer 238. Outer mesh layer 238 only allows particles having a size at least as great as approximately 2 µm into filter 236. The material of outer mesh layer 238 has a permeability of approximately 520 cfm/ft² (cubic feet per minute per square foot). Recirculation filter 236 includes an absorbent thin layer 240. Absorbent thin layer 240 includes a fine mesh. In general, absorbent thin layer 240 retains loose particles in filter 236. Since outer mesh layer 238 only allows particles having a size at is least as great as approximately 2 µm into filter 236, the absorbent thin layer 240 includes material that retains loose particles in the filter that are of a size at least as great as approximately 2 µm. The material of absorbent thin layer 240 has a permeability of approximately 570 cfm/ft². Recirculation filter 236 also includes an absorbent thick layer 242. Absorbent thick layer 242 traps particles that outer mesh layer 238 has allowed into filter 236. Therefore, absorbent thick layer 242 includes material that traps particles having a size of at least as great as approximately 2 µm. The material of absorbent thick layer 242 has a permeability of approximately 400 cfm/ft².

Figure 4:
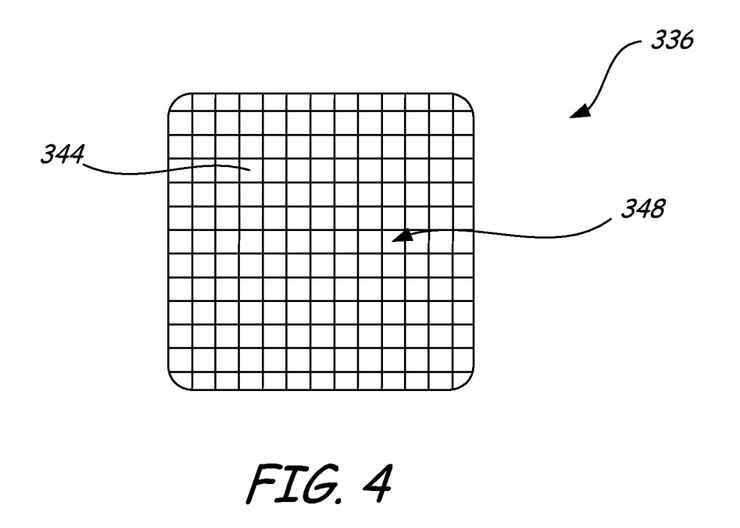
FIG. 4 illustrates a front view of a recirculation filter in accordance with embodiments of the present invention.
Figure 5:
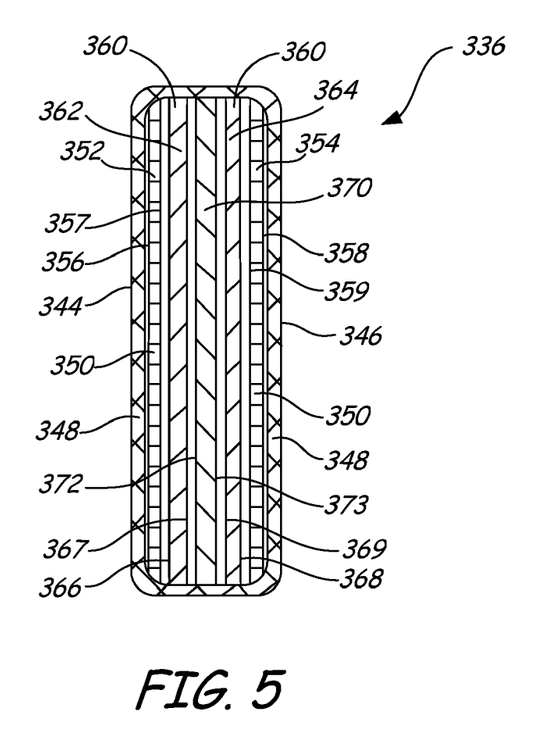
FIG. 5 is a sectional view of the recirculation filter illustrated in FIG. 4.

FIGS. 4 and 5 illustrate front and sectional views, respectively, of recirculation filter 336 in accordance with the present invention. Recirculation filter 336 includes a first side 344 and a second side 346. Airflow from the recirculation airflow in disc drive 100, for example, can enter at first side 344 of recirculation filter 336 and can exit at second side 346 of recirculation filter 336. Recirculation filter 336 includes an outer mesh layer 348. Outer mesh layer 348 is the outermost layer of recirculation filter 336 that surrounds the remaining layers of recirculation filter 336. Outer mesh layer 348 is the layer of filter 336 that is exposed to the recirculation airflow that contains particles in a disc drive, such as disc drive 100, prior to other layers in recirculation filter 336. A variety of different sized particles from the recirculation airflow can penetrate outer mesh layer 348 because it has a coarse mesh. For example, outer mesh layer 348 can allow particles in the airflow to enter filter 336 that have sizes at least as great as approximately 20 µm. Outer mesh layer 348 is made of a polypropylene or polyethylene scrim material that has a permeability of approximately 900 cfm/ft². Outer mesh layer 348 of filter 336 has a higher permeability than outer mesh layer 238 of prior art filter 236. In addition, outer mesh layer 348 can allow larger sized particles into filter 336 than outer mesh layer 248 can allow into prior art filter 236.

Recirculation filter 336 includes a first absorbent thin layer 350. First absorbent thin layer 350 includes a first portion 352 and a second portion 354. First portion 352 includes a first side 356 and a second side 357 and second portion 354 includes a first side 358 and second side 359. First side 356 of first portion 352 is adjacent first side 344 of outer mesh layer 348. First side 358 of second portion 354 is adjacent second side 346 of outer mesh layer 348. First absorbent thin layer 350 is made of a coarse mesh or a large sized mesh. In general, absorbent thin layer 350 retains loose particles in the filter and supports other layers in filter 336. Since outer mesh layer 348 allows both large and small sized particles (i.e. particles having a size at least as great as approximately 20 µm) into filter 336, the first absorbent thin layer 350 includes material to retain loose particles in the filter that are of a size as at least as great as approximately 20 µm. First absorbent thin layer 350 is made of a polypropylene or polyethylene scrim material that has a permeability of approximately 1,526 cfm/ft². First absorbent thin layer 350 of filter 336 has a higher permeability than absorbent thin layer 240 of prior art filter 236.

Recirculation filter 336 includes a second absorbent thin layer 360. Second absorbent thin layer 360 includes a first portion 362 and a second portion 364. First portion 362 of second absorbent thin layer 360 includes a first side 366 and a second side 367 and second portion 364 includes a first side 368 and second side 369. First side 366 of first portion 362 is adjacent second side 357 of the first portion 352 of first absorbent thin layer 350. First side 368 of second portion 364 is adjacent second side 359 of the second portion 354 of first absorbent thin layer 350. Second absorbent thin layer 360 is configured to capture large sized particles. For example, particles can have a range of sizes between approximately 2 µm and 20 µm. Second absorbent thin layer 360 is made of laminate/membrane such as polyester. Second absorbent thin layer 360 is configured to capture large sized particles by sieving (i.e., particles are too large to pass through openings in second absorbent thin layer 360) and impaction (i.e., particles are too large to follow the air stream through absorbent thin layer 360 and therefore impact on fibers in their path).

Recirculation filter 336 also includes an absorbent thick layer 370. Absorbent thick layer 370 includes a first side 372 and a second side 373. First side 372 of absorbent thick layer 370 is adjacent second side 367 of the first portion 362 of second absorbent thin layer 360. Second side 373 of absorbent thick layer 370 is adjacent second side 369 of the second portion 364 of second absorbent thin layer 360. Absorbent thick layer 370 is configured to trap small sized particles. For example, particles having a range of size at least as great as approximately 2 µm. Absorbent thick layer 370 is made of an electret material, such as a polypropylene electret that has a permeability of approximately 500 cfm/ft². Absorbent thick layer 370 of filter 336 has a higher permeability than absorbent thick layer 242 of prior art filter 236.

Figure 6:
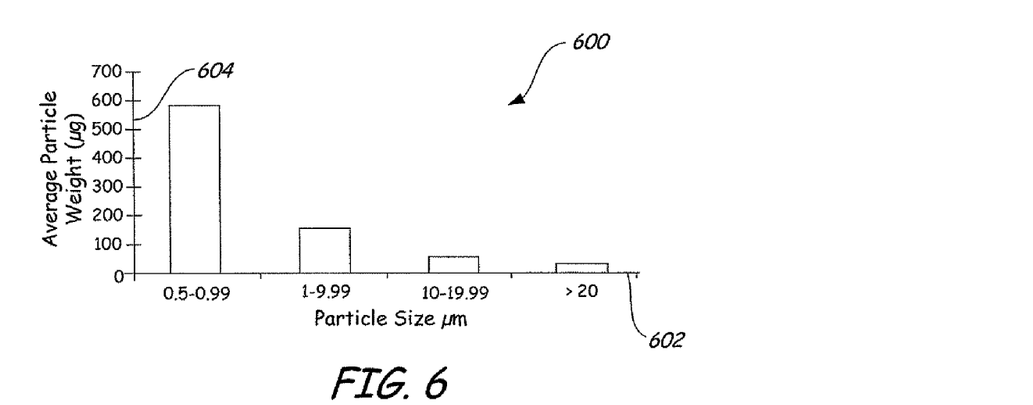
FIG. 6 is a plot illustrating particle size distribution of particles injected into a disc drive for filter experimentation.

In one experiment, filter 236 (FIGS. 2 and 3) and filter 336 (FIGS. 4 and 5) are each placed in a disc drive, such as disc drive 100. The disc drives are injected or doped with approximately 0.03 grams of aluminum oxide particles while the disc is spinning (i.e., in a dynamic condition). FIG. 6 is a plot 600 that illustrates the particle size distribution on the horizontal axis 602 of the injected particles. The particle size distribution ranges between 0.5 µm to 20 µm. The vertical axis 604 illustrates the corresponding weight of each particle size distribution of the injected particles. After injecting particles into the disc drive, the disc drive is allowed to spin the disc for five minutes and perform 5 contact start stops by an actuator mechanism, such as actuator mechanism 126 (FIG. 1).

Figure 7:
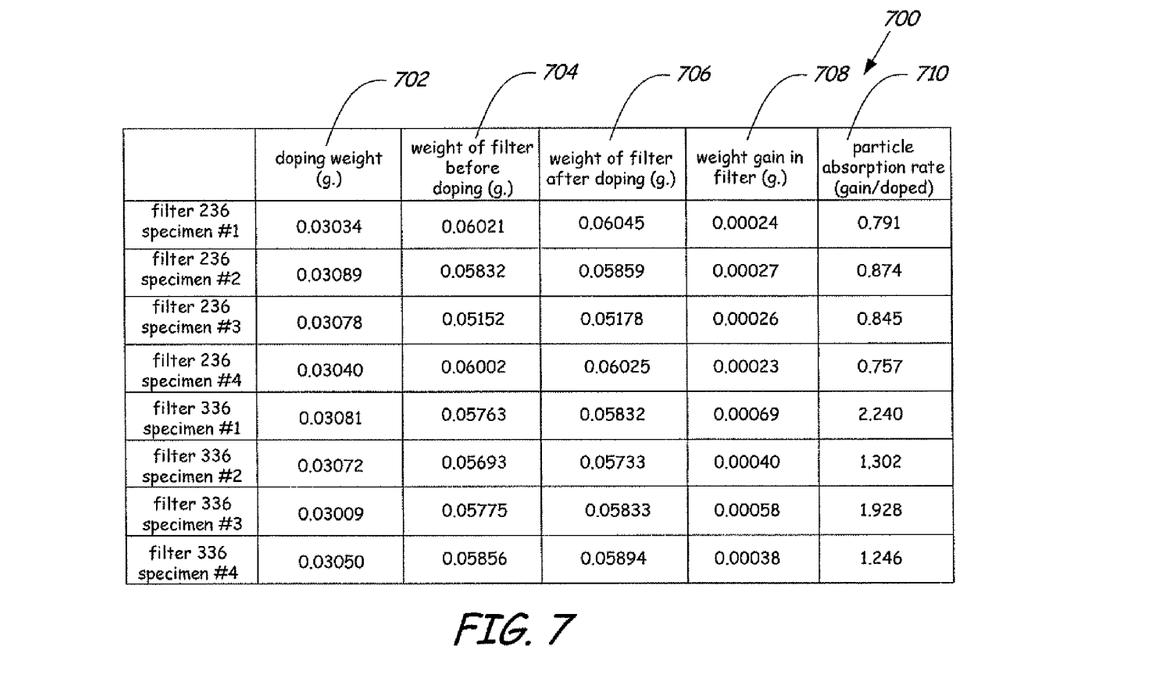
FIG. 7 is a table illustrating average weight gain of a prior art filter compared to a filter of the present invention.

FIG. 7 is a table 700 illustrating the average weight gain of filter type 236 and filter type 336. Four filter type 236 specimens were tested as well as four filter type 336 specimens were tested. Column 702 illustrates the doping weight in grams of particles for each specimen. Column 704 illustrates the weight in grams of each filter before doping in grams. Column 706 illustrates the weight in grams of each filter after doping. Column 708 illustrates the weight gain in grams for each filter. Column 710 illustrates the particle absorption rate of each filter The absorption rate is equivalent to the weight gain of a filter divided by the doping weight. The average particle absorption rate of the filter type 236 specimens was 0.817. The average particle absorption rate of the filter type 335 specimens was 1.679. These experimental results show that filter 336 of the present invention provides a filter weight gain and particle absorption rate that is at least two times higher than that of prior art filter 236. Therefore, filter 336 is able to trap more particles than prior art filter 236.

Figure 8:
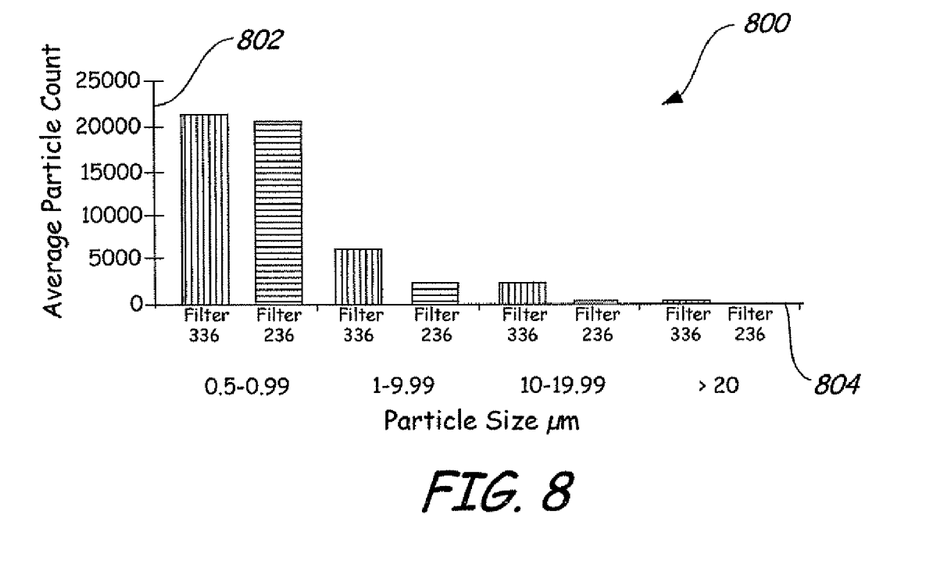
FIG. 8 is a plot comparing the efficiency of particle collection between a prior art filter and a filter of the present invention.

In another experiment, particles are dislodged from filter specimens 236 and 336 to compare filter efficiencies. FIG. 8 illustrates a plot 800 comparing the efficiency of particle collection between recirculation filter 336 of the present invention as illustrated in FIGS. 4 and 5 and recirculation filter 236 of the prior art as illustrated in FIGS. 2 and 3. The vertical axis 802 shows average particle counts and the horizontal axis 804 shows particle size ranges in μm. In the particle size range of 0.5 to 0.99 μm, the average amount of particles counted for recirculation filter 336 was approximately 21,500, while the average amount of particles counted for recirculation filter 236 was approximately 20,500. In the particle size range of 1 μm to 9.99 μm, the average amount of particles counted for recirculation filter 336 was approximately 6,500, while the average amount of particles counted for recirculation filter 236 was approximately 2,500. In the particle size range of 10 μm to 19.99 μm, the average amount of particles counted for recirculation filter 336 was approximately 2,500, while the average amount of particles counted for recirculation filter 236 was approximately 500. In the particle size range of greater than 20 μm, the average amount of particles counted for recirculation filter 336 was approximate 500, while the average amount of particles counted for recirculation filter 236 was zero.

The results illustrated in FIG. 8 show that filter 336 has an improved efficiency to trap all sizes of particles over prior art filter 236. In addition, filter 336 is two to three times more efficient in trapping particles that of large sized (i.e., particles that range in the size of approximately 2 μm to 20 μm) than prior art filter 236. Such efficiency results lead to a positive effect on more particles being trapped by filter 336 and, therefore, a reduction in the occurrence of particle-induced scratch on the media.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the recirculation device while maintaining substantially the same functionality without departing from the scope and spirit of the present invention. In addition, although the preferred embodiment described herein is directed to a recirculation filter for a data storage system, it will be appreciated by those skilled in the art that the teachings of the present invention can be applied to other types of electronic devices, without departing from the scope and spirit of the present invention.

What is claimed is:

1. A recirculation filter comprising:
    a first layer defined between a first side and an opposing second side, the first layer configured to trap particles that are of a first size;
    a second layer having a first portion including a first side and a second side and a second portion including a first side and a second side, the second side of the first portion is adjacent to the first side of the first layer and the second side of the second portion is adjacent the second side of the first layer, the second layer configured to trap particles that are of a second size, wherein the second size of particles trapped by the second layer are greater than the first size of particles trapped by the first layer; and
    a third layer having a first portion including a first side and a second side and a second portion including a first side and a second side, the second side of the first portion of the third layer being adjacent the first side of the first portion of the second layer and the second side of the second portion of the third layer being adjacent the first side of the second portion of the second layer.

2. The recirculation filter of claim 1, wherein the first layer comprises an absorbent thick layer configured to trap particles having a size at least as great as approximately 2 μm.

3. The recirculation filter of claim 1, wherein the second layer comprises an absorbent thin layer configured to trap particles having a size at least as great as approximately 20 μm.

4. The recirculation filter of claim 1, wherein the third layer comprises an absorbent thin layer having a coarse mesh, the absorbent thin layer configured to retain loose particles in the recirculation filter not trapped by the first and second layers and configured to support the first layer and the second layer.

5. The recirculation filter of claim 1, further comprising a fourth layer, the fourth layer surrounding the first, second and third layers.

6. The recirculation filter of claim 5, wherein the fourth layer comprises an outer mesh layer having a coarse mesh, wherein particles at least as great as approximately 20 μm are able to penetrate the outer mesh layer.

7. The recirculation filter of claim 1, wherein the third layer comprises polyester.

8. A filter comprising:
    an absorbent thick layer configured to trap a first range of particle sizes;
    a first absorbent thin layer positioned about the absorbent thick layer and configured to trap a second range of particle sizes, wherein the second range of particle sizes is greater than the first range of particle sizes; and
    an outer mesh layer positioned about the first absorbent thin layer and the absorbent thick layer.

9. The filter of claim 8, wherein the first range of particle sizes trapped by the absorbent thick layer comprise particles having a size at least as great as approximately 2 μm.

10. The filter of claim 8, wherein the second range of particle sizes trapped by the first absorbent thin layer comprise particles having a size at least as great as approximately 20 μm.

11. The filter of claim 8, further comprising a second absorbent thin layer positioned about the first absorbent thin layer and the absorbent thick layer and configured to retain loose particles in the recirculation filter not trapped by the absorbent thick layer and the first absorbent thin layer, wherein the outer mesh is positioned about the second absorbent thin layer.

12. The filter of claim 8, wherein the outer mesh layer comprises a coarse mesh, wherein particles at least as great as approximately 20 μm are able to penetrate the coarse mesh.

13. The filter of claim 8, wherein the first absorbent thin layer comprises a first portion and a second portion, the first portion includes a first side and a second side and the second portion includes a first side and a second side, the second side of the first portion is adjacent a first side of the absorbent thick layer and the second side of the second portion is adjacent a second side of the absorbent thick layer.

14. For use in an enclosure housing an element susceptible to undesired particle impingement, a recirculation filter positioned within the enclosure to filter the particles, the recirculation filter comprising:

a first inner layer filter means for trapping a first range of particles that are at least as great as a first size and having first and second exterior sides;

a second inner layer filter means positioned adjacent to the first and the second exterior sides of the first inner layer and configured to trap a second range of particles that are at least as great as a second size, wherein the second range of particles trapped by the second layer are greater than the first range of particle;

an outer layer positioned about the first inner layer filter means and the second inner layer filter means; and a third inner layer filter means positioned between the second inner layer filter means and the outer layer.

15. The recirculation filter of claim 14, wherein the first range of particles of the first size comprise particles having a size at least as great as approximately 2 μm.

16. The recirculation filter of claim 14, wherein the second range of particles of the second size comprise particles having a size at least as great as approximately 20 μm.

* * * * *

UNITED STATES PATENT AND TRADEMARK OFFICE
CERTIFICATE OF CORRECTION

PATENT NO.      : 7,585,358 B2                               Page 1 of 1
APPLICATION NO. : 11/466970
DATED           : September 8, 2009
INVENTOR(S)     : Oo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 479 days.

Signed and Sealed this

Fourteenth Day of September, 2010

David J. Kappos
*Director of the United States Patent and Trademark Office*